May 30, 1939. V. E. CARBONARA 2,160,326
APPARATUS FOR CONTROLLING THE AMOUNT OF A GAS IN A CLOSED REGION
Filed Dec. 19, 1934
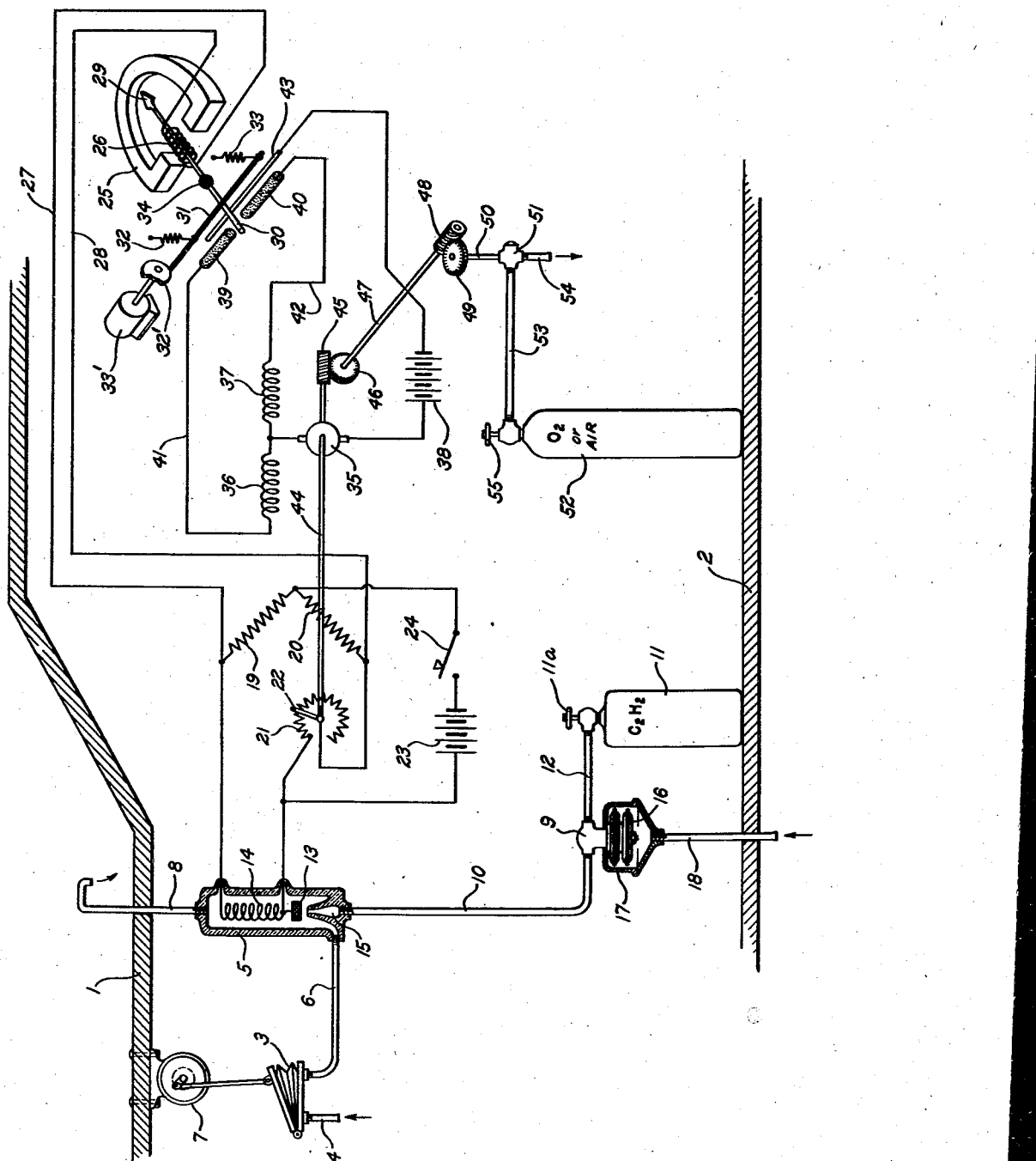
INVENTOR.
Victor E. Carbonara
BY Stephen Cerstvik
ATTORNEY.

Patented May 30, 1939

2,160,326

UNITED STATES PATENT OFFICE 2,160,326

APPARATUS FOR CONTROLLING THE AMOUNT OF A GAS IN A CLOSED REGION

Victor E. Carbonara, Rockville Centre, N. Y., assignor to Bendix Aviation Corporation, South Bend, Ind., a corporation of Delaware Application December 19, 1934, Serial No. 758,341

10 Claims. (Cl. 128—191)

This invention relates to apparatus for controlling a supply of a gas such as oxygen to a closed space or desired region, and more particularly to apparatus for maintaining the density or amount of oxygen per unit volume substantially constant in a closed space or desired region such as a cabin of an airplane, i. e., for maintaining the density or amount of oxygen per unit volume in the cabin at such a value as is necessary to keep the pilot and passengers within the cabin comfortable irrespective of their number and/or irrespective of the rarification of air in the cabin due to changes in altitude.

The invention consists substantially in the construction, combination, location and relative arrangement of parts for obtaining the results desired, as will be more fully hereinafter set forth in the following specification, as shown in the accompanying drawing, and as finally pointed out in the appended claims.

It has been found that in a relatively closed space or desired region as, for example, in a closed cabin passenger plane flying at high altitudes, the air becomes rarified in the cabin due to increased altitude and, hence, provides less oxygen per unit volume in the cabin than is normally required to keep the body functioning properly, thereby producing an undesirable effect of closeness or grogginess on the passengers because of lack of a sufficient amount of oxygen. The density or amount of oxygen per unit volume is also decreased when the number of persons in the cabin is increased, i. e., when there are more persons in the cabin more of the oxygen will be used up thereby reducing the amount of oxygen per unit volume. Accordingly, one of the objects of the present invention is to provide novel means for automatically supplying fresh oxygen to a relatively closed space such as a cabin, from a suitable source of supply, in the necessary amounts required to keep the amount of oxygen per unit volume substantially constant and, hence, to keep the passengers comfortable irrespective of whether the amount of oxygen per unit volume has been decreased due to rarification of the air or due to the increase in the number of persons within the cabin.

Another object is to provide a novel automatically controlled apparatus for admitting oxygen to a closed space, such as a cabin of an airplane, when necessary and, in accordance with the invention, this is accomplished by a novel combination which includes a device for a continuously analyzing the air in the closed space in order to determine whether the amount of oxygen per unit volume has increased or decreased, means for supplying oxygen to said space, and means automatically effective when the amount of oxygen per unit volume increases or decreases with respect to a predetermined value, as determined by the analyzer, for controlling the oxygen supply to said closed space in such amounts as are necessary to keep the amount of oxygen per unit volume substantially constant.

A further object of the invention is to provide novel apparatus for maintaining the amount of oxygen per unit volume substantially constant and at a desired value in a closed cabin of an airplane flying at high altitudes, including means for continuously providing a sample of air from the cabin, means for causing the oxygen in said sample to produce combustion which is proportional to the amount of oxygen per unit volume, means for supplying fresh oxygen to said cabin, and means responsive to the temperature changes produced by the combustion for controlling the oxygen supplied to said cabin.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only and is not to be construed as defining the limits of the invention, reference being had to the claims for this purpose.

The single figure of the drawing is a schematic view illustrating one form and relative arrangement of the elements constituting the novel combination embodying the invention.

In the drawing, the closed space as, for example, the cabin of an airplane, is represented by the roof 1 of the cabin and the floor 2 thereof, it being understood, of course, that the cabin is also provided with side walls (not shown).

In accordance with the invention, means are provided for continuously analyzing the air within the cabin to determine whether the amount of oxygen per unit volume has changed and, in the form shown, said means comprise a suitable pump 3 having provisions for sucking a sample of air from the cabin through the inlet 4 and pumping the sample into a chamber 5 by means of a pipe 6, it being understood that the structure of the pump 3 is such that the inlet 4 is open and the pipe 6 is closed when the air is being sucked in but when the air is being pumped to the closed chamber 5 then the pipe 6 is open and the inlet 4 is closed. Such a pump is well-known in the art and, therefore, need not be described in detail herein. The pump is continuously operated at constant speed by any suitable power means such, for example, as a motor 7.

The chamber 5 is preferably of glass or some other suitable insulating and heat resisting material and the upper end thereof is placed in communication with the atmosphere outside of the cabin by means of a pipe 8 while the lower end is connected to a valve 9 by means of a pipe 10, the valve 9 being connected to and controlling a supply of acetylene or other suitable combustible gas from a tank 11 which is connected to the valve 9 by means of a pipe 12.

Means are now provided for producing combustion by the sample of air within the analyzing chamber 5 and, in the form shown, comprise a piece of platinum sponge 13 suspended in said chamber 5 from a wire coil 14 over an orifice 15 through which the acetylene or other suitable combustible gas from tank 11 is passed by means of the pipe 12, valve 9 and pipe 10.

It is well-known that when acetylene gas, or alcohol vapor, or other suitable combustible gas such as hydrogen comes in contact with platinum in the presence of air (containing oxygen), the platinum becomes heated to incandescence. Accordingly, as the acetylene gas issues from orifice 15 and strikes the platinum sponge 13, said sponge becomes heated to incandescence in the presence of the air within the chamber 5, which is supplied from the cabin by means of the pump 3, thereby using up the oxygen in the sample of air by burning the acetylene and thus heating the coil 14. If the amount of oxygen in the sample of air is high, the combustion will be greater in chamber 5, thus causing the coil 14 to become heated to a higher degree whereby its electrical resistance is increased. On the other hand, if the amount of oxygen is low, the combustion produced in the chamber 5 will be lower and the electrical resistance of the coil will be decreased. The products of combustion in the chamber 5 are passed to the atmosphere by means of the pipe 8.

It is desirable, however, that the supply of acetylene or other suitable combustible gas passed to the analyzing chamber 5 be maintained constant irrespective of changes of altitude or barometric pressure. To this end, means are provided for controlling the valve 9 in accordance with said changes in altitude or barometric pressure. As shown in the drawing, said means are constituted by a barometric pressure-responsive device in the form of an aneroid 16 contained within a closed chamber 17 which is placed in communication with the atmosphere outside of the cabin by means of a pipe 18. Accordingly, as a high altitude is reached the aneroid device 16 expands and operates the valve 9 to restrict the passage of acetylene gas from the tank 11 to the chamber 5 because at high altitudes the atmospheric or barometric pressure is lower and, consequently, the gas which is in tank 11, would issue from said tank in greater quantities. On the other hand, as the altitude decreases, the acetylene would issue from the tank in smaller quantities and, consequently, the aneroid device is effective to provide a larger passage through the valve 9 so that more gas may pass therethrough because the aneroid device 16 collapses when the atmospheric pressure increases due to decreased altitude. A manually operable valve 11a is provided for completely shutting off the acetylene gas supply when not needed.

Means are now provided for employing the electrical resistance changes in the wire coil 14 due to changes in temperature to operate a device for controlling and admitting a supply of oxygen from a suitable source, such as a pressure tank, to the cabin in accordance with said resistance and temperature changes and, hence, in accordance with changes in the amount of oxygen per unit volume within the cabin, inasmuch as the changes in temperature and resistance of the wire coil 14 are proportional to the changes in the amount of oxygen. As illustrated in the drawing, said means include the wire coil 14 which, preferably, is also of platinum, and an electrical circuit which may be that of an electric thermometer wherein temperature changes are indicated and/or detected by means of voltage changes in the circuit due to changes in resistance, or an equivalent circuit wherein resistance changes in the coil 14 produce changes in current flow. As previously stated, the wire coil 14 is preferably of platinum because the resistance of platinum increases in relatively large increments for relatively small increments of increase in temperature. However, any other suitable conducting material may be employed, the resistance of which changes with temperature.

The electrical circuit in the present instance is in the form of a Wheatstone bridge one arm of which comprises equal and fixed resistances 19 and 20 and the other arm of which comprises the coil 14 and a variable resistance 21 having a rotating sliding contact 22 which may be operated in a manner to be described hereinafter. The Wheatstone bridge circuit is energized from a suitable source of current such as a battery 23 which may be connected to or disconnected from the circuit by means of a switch 24. Normally, the resistance 21 is set to a value corresponding to the value of the resistance of coil 14 when the latter is preferably in a hot state corresponding to the temperature produced when combustion within chamber 5 is caused by the amount of oxygen per unit volume necessary in the cabin. Thus, it will be seen that when the amount of oxygen per unit volume falls below the required value, combustion in the chamber 5 will decrease and, hence, the resistance of coil 14 will decrease below the set value of resistance 21 thereby unbalancing the Wheatstone bridge circuit and causing a current to flow in said circuit. On the other hand, if the amount of oxygen in the cabin should exceed the required value, combustion in chamber 5 will increase and, hence, the resistance of coil 14 will increase above the adjusted value of resistance 21 thereby also unbalancing the Wheatstone bridge circuit but the current will then flow in the circuit in an opposite direction.

Means are now provided for indicating and employing the magnitude and direction of the current flow in the Wheatstone bridge circuit, and for employing the current changes to operate a torque amplifier which, in turn, operates a valve for regulating the supply of oxygen to the cabin. In the form shown, the indicating means comprise a galvanometer constituted by a permanent magnet 25 and a moving coil 26 interposed between the poles of the magnet and connected to the Wheatstone bridge circuit by means of wires 27 and 28, said moving coil 26 being arranged to operate a pointer 29 which may cooperate with a suitable scale (not shown) calibrated to indicate the amount of oxygen per unit volume contained within the cabin. Thus, if the current flow in the bridge circuit is in one direction the pointer 29 may move to the left, and if the current flow is in an opposite direction the pointer may move to the right.

The galvanometer, however, is a delicate instrument and does not provide sufficient torque to operate a mechanical control device for regulating the oxygen supply. The torque is, therefore, amplified by some suitable means which, in the form illustrated in the drawing, are constituted by an extension 30 of the pointer 29, which extension moves to the right when the pointer moves to the left and vice versa. Above the extension 30 there is provided a transversely extending rod or bar 31, preferably of insulating material, which is normally held above said extension by means of a pair of springs 32 and 33 having one of their respective ends connected to the bar and their other ends connected to a fixed support. Thus, in this position of the bar 31, the pointer 29 and, hence, its extension 30, is free to move when the moving coil 26 is energized. In order that extension 30 may be completely free to move and also operate as a circuit closer, it is moved into circuit closing position intermittently only, as will now be set out.

Cooperating with the bar 31 there is provided a cam 32 which is slowly rotated by any suitable means such as a motor 33' whereby, as said cam 32' rotates, the bar 31 presses the extension 30 downward. The extension 30 is preferably of some suitable conducting material and is insulated from pointer 29 by means of insulation 34 and is utilized to close the circuit of a reversible electric motor 35 having opposed field windings 36 and 37 which are adapted to be alternately energized from a suitable source of electric energy such as a battery 38 in a manner and for a purpose which will appear later. To this end there is provided a pair of carbon resistance rods 39 and 40 arranged longitudinally of each other in spaced relation and transversely of the extension 30, the latter, when in zero position of the pointer 29, being arranged to fall in the space between the rods 39 and 40 when said extension is depressed by the bar 31 so that normally the circuit of the motor 35 is open.

The carbon resistance rod 39 is connected to the field winding 36 by means of a lead 41 and the corresponding rod 40 is connected to the field winding 37 by means of a lead 42, the other ends of the windings 36 and 37 being connected together and to one terminal of the armature of the motor 35. The other terminal of the armature is connected through the source 38 to a conducting rod 43 which is adjacent and parallel to the rods 39 and 40 and in the same plane therewith so that upon movement of the extension 30 to the left or to the right and upon depression thereof by means of the bar 31 and cam 32', the circuit of the electric motor is closed either by means of the rod 39 and rod 43 so that current flows through the field winding 36, or by means of the rod 40 and rod 43 so that current flows through the field winding 37. Thus, in one instance the motor 35 will rotate in one direction and in the second instance it will rotate in the opposite direction.

It will be noted that the extension 30 and the carbon resistance rods 39 and 40 are so located and arranged that as the pointer is moved further to the left or right from its zero position due to increased current flow in the moving coil 26, the extension 30 will engage carbon rod 40 or carbon rod 39, when said extension is depressed by the bar 31, at a point nearer to the ends at which the leads 42 and 41 are connected to said rods thereby shortening the effective length of said carbon rods and, hence, increasing the current flow through the armature and the corresponding field winding of motor 35 whereby the latter is made to rotate faster. Thus, the speed of the motor and its direction of rotation are controlled in accordance with the magnitude and direction of the current flow in moving coil 26 from the Wheatstone bridge circuit.

The motor 35 has a shaft 44 one end of which is connected to and adapted to rotate the contact arm 22 of the resistance 21 and the other end of which is provided with a worm 45 engaging a worm gear 46 secured to a shaft 47. The shaft 47 is, in turn, provided with a worm 48 which meshes with a worm gear 49, the latter being secured to a valve stem 50 of a valve 51 for controlling the latter to regulate the flow of oxygen from a suitable source such as a pressure tank 52 to the cabin by means of pipes 53 and 54. The oxygen tank 52 is also provided with a manually operable valve 55 for completely shutting off the supply of oxygen when desired as, for example, when the aircraft on which the apparatus is mounted is on the ground and stored in a hangar. Thus, it will be seen that as the motor 35 rotates in one direction or another the valve 51 will be opened or closed to admit more or less oxygen to the cabin and at a rate proportional to the rate at which the oxygen is used up.

It is desirable, however, that the motor 35 be stopped as and when the required amount of oxygen per unit volume is being passed to the cabin. This is accomplished simultaneously with the operation of the valve 51 and is effected by causing the shaft 44 to rotate the contact arm 22 of the resistance 21 in such a direction that the value of said resistance 21 will be made equal to the resistance of the wire coil 14 thereby balancing the Wheatstone bridge circuit. As soon as the bridge circuit is balanced no current will flow through the moving coil 26 and, hence, the circuit of electric motor 35 will be opened and the motor will stop, leaving the valve in the position necessary to pass the required amount of oxygen to the cabin at that particular time.

The apparatus operates as follows: a sample of air is continuously pumped from the cabin 1—2 by means of the pump 3 and pipe 4 through pipe 6 to chamber 5 of the gas analyzer where acetylene gas is also passed thereinto from tank 11 by means of pipes 10—12 and valve 9 at a constant rate of flow irrespective of altitude because valve 9 is controlled by the aneroid 16. As the acetylene gas strikes the platinum sponge 13 the latter becomes heated to incandescence, thus igniting the gas and producing combustion thereof, whereby the resistance of coil 14 is varied in accordance with the amount of heat produced therein by the burning of the acetylene gas with the oxygen in the sample of air. If, for example, the amount of oxygen in the sample of air is below the value required, due to rarification or due to an increase in the number of persons using it, the combustion will glow less, and less heat will be produced within the chamber 5, thus decreasing the resistance of the wire coil 14. The decreasing of the resistance of coil 14 unbalances the Wheatstone bridge circuit whereby current is caused to flow in one direction in the moving coil 26 of the galvanometer and in proportion to the amount of unbalance of the bridge circuit, thus deflecting the pointer 29 to the left, for example. As the pointer moves to the left its extension 30 is moved to the right and by the action of the cam 32' and the depressing rod 31 said extension 30 is caused to engage the carbon resistance rod 40 and conducting rod 43 thereby closing the circuit of the electric motor 35 through the field winding 37, whereupon the motor rotates and at a speed inversely proportional to the length of the carbon resistance rod 40 in the circuit, i. e., if the entire length of the rod 40 is in circuit the current flow in the motor will be less and, hence, the speed will be less. On the other hand, if less of the resistance rod 40 is in circuit more current will flow through the electric motor and, hence, the motor will rotate faster. As the motor 35 rotates it operates the valve 51 through the worm 45, worm gear 46, shaft 47, worm 48, worm gear 49 and stem 50 to admit more oxygen into the cabin from the oxygen tank 52 by means of pipes 53 and 54. At the same time, however, the motor 35 operates the contact arm 22 of the resistance 21 by means of the shaft 44 until said resistance 21 balances the then resistance of coil 14, whereupon the bridge circuit becomes balanced and no current flows to the moving coil 26 of the galvanometer. As a result, the pointer 29 will return to its zero position whereby the extension 30 becomes disengaged from the carbon rod 40 and conducting rod 43. The motor circuit is thus opened and the motor stopped, leaving the valve 51 in the position necessary to pass the required amount of oxygen to the cabin at that particular time.

On the other hand, if the amount or density of the oxygen in the sample of air is above the required value, due to a compression of the air or due to a decrease in the number of persons using it, more combustion will be produced in the chamber 5 by the gas analyzer thereby increasing the resistance of the wire coil 14. The increased resistance of the coil 14 will also unbalance the Wheatstone bridge circuit thereby causing a current to flow in the moving coil 26 of the galvanometer but the direction of the current flow will be opposite to that in the case when the resistance of the coil 14 was decreased. The pointer 29 will, therefore, move to the right and the extension 30 will engage carbon rod 39 and conducting rod 43 to close the motor circuit through the field coil 36 thereby causing the motor to rotate in a direction opposite to that in which it was previously rotated. The opposite rotation of the motor will actuate the valve 51 to decrease the supply of oxygen passing from the tank 52 to the cabin through the pipes 53 and 54. At the same time, the contact arm 22 will be rotated in a direction to increase the value of the resistance 21 to correspond to the then resistance of the coil 14 whereupon the bridge becomes again balanced, pointer 29 returns to zero, and the motor 35 stops, again leaving the valve 51 in the position necessary to pass the required amount of oxygen to the cabin at this particular time.

From the foregoing it will be seen that in accordance with the invention the valve 51 is automatically operated to permit oxygen to pass to the cabin in amounts inversely proportional to the temperature produced in the chamber 5 and coil 14 and, hence, in amounts inversely proportional to the amount of oxygen in the air within the cabin, i. e., as the oxygen becomes used up more quickly due to an increase in the number of passengers in the cabin, or less oxygen becomes available due to rarification of air at high altitudes, a fresh supply of oxygen is automatically provided within the cabin in order to compensate for that which has been used up or rarified and in such amounts as may be necessary to keep the passengers comfortable.

There is thus provided a novel apparatus for controlling a supply of oxygen to a closed space, such as a cabin of an airplane, so that the amount of oxygen per unit volume is maintained substantially constant therein irrespective of the rate at which the oxygen is used up due to either a greater number of passengers or rarification of air at high altitudes, or both.

By the expression "amount of oxygen per unit volume" is meant the number of molecules of oxygen contained in that volume, i. e., the density of the oxygen and not the oxygen content of air, because the per cent of oxygen in air by volume does not change upon rarification of the air. For example, if there are N molecules of air in one cubic foot there are approximately $$\frac{N}{5}$$

molecules of oxygen, i. e., air contains about twenty-one per cent oxygen. If the one cubic foot of air is expanded to five cubic feet, thereby rarifying it, the five cubic feet will still have N molecules of air and the oxygen content will still be twenty-one per cent or $$\frac{N}{5}$$

molecules but there will be only $$\frac{N}{5}$$

molecules of air per cubic foot and $$\frac{N}{25}$$

molecules of oxygen per cubic foot. Therefore, it is the number of molecules per unit volume or the density of the oxygen which it is desired to maintain substantially constant and, preferably, at such a value as is necessary to keep the human body functioning properly and a person comfortable.

Although only one embodiment of the invention has been illustrated and described, various changes in the construction, location and relative arrangement of parts, which will now appear to those skilled in the art may be made without departing from the scope of the invention. For example, the analyzer 5 and the operating mechanism, including the torque amplifier, may be of a form other than that shown in the drawing as long as they may be combined to properly control the oxygen supply in accordance with the invention. Also, in accordance with the broad concept of the invention and by means of the novel combination of elements constituting the invention, it is posssible to control the supply of gases other than oxygen to a region so long as means are provided which are responsive to the changes in the density of the gas in said region, in combination with means operable by said change-responsive means for supplying said gas to said region in substantially inverse proportion to the changes in the density of said gas in said region. Or, in the embodiment shown in the drawing, the tank 52 may be a compressed air tank containing air under pressure so that air may be supplied to the cabin instead of pure oxygen. Reference is, therefore, to be had to the appended claims for a definition of the limits of the invention.

What is claimed is:

1. In combination, an oxygen tank containing oxygen under pressure, means for supplying said oxygen to a desired region containing air, means for obtaining a sample of said air from said region, means for producing combustion by the oxygen in said sample of air, whereby a temperature is produced which changes in accordance with the amount per unit volume of said oxygen in said sample of air, control means responsive to said temperature changes, and means operable by said temperature responsive control means for operating said oxygen supplying means to supply said oxygen to said desired region in substantially inverse proportion to the amount per unit volume of said oxygen in said sample of air.

2. In combination, an oxygen tank containing oxygen under pressure, means for supplying said oxygen to a desired region containing air, means for providing a sample of said air from said region, means for producing combustion by the oxygen in said sample of air, whereby a temperature is produced which changes in accordance with the amount per unit volume of said oxygen in said sample of air, electrical control means responsive to said temperature changes, and means operable by said temperature responsive control means for operating said oxygen supplying means to supply said oxygen to said desired region in substantially inverse proportion to the amount per unit volume of said oxygen in said sample of air.

3. In combination, an oxygen tank containing oxygen under pressure, means for supplying said oxygen to a desired region containing air, means for continually providing a sample of air from said region, means for producing combustion by the oxygen contained in said sample of air whereby a temperature is produced which changes in accordance with changes in the amount per unit volume of said oxygen in said sample of air, an electrical circuit including a resistor element exposed to the combustion produced by said sample of air whereby the resistance of said resistor element is changed by said temperature changes and a current is caused to flow in said circuit, said current having a magnitude which is a function of the changes in the amount per unit volume of the oxygen in the sample of air, means responsive to said current, and means controlled by said current responsive means for operating said oxygen supplying means to supply oxygen from the oxygen tank to the desired region in substantially inverse proportion to the amount per unit volume of the oxygen in the sample of air.

4. In combination, an oxygen tank containing oxygen under pressure, means for supplying said oxygen to a desired region, a combustion chamber, means for passing some of the oxygen from the region to said combustion chamber, means for producing combustion in said chamber by the oxygen passed thereinto whereby a temperature is produced in said chamber which changes in accordance with the density of the oxygen, a normally balanced Wheatstone bridge circuit incuding a resistance element located in said combustion chamber whereby the resistance of the element changes with the changes in temperature and as a function of the density of the oxygen and said bridge circuit becomes unbalanced and a current is caused to flow therein, control means responsive to said current, and actuating means controlled by said control means for operating the oxygen supplying means to supply oxygen to the desired region in substantially inverse proportion to the density of the oxygen in said region.

5. In combination, an oxygen tank containing oxygen under pressure, means for supplying said oxygen to a desired region, a combustion chamber, means for supplying some of the oxygen from the region to said combustion chamber, means for supplying a combustible gas to said combustion chamber, atmospheric pressure controlled means for maintaining the supply of said combustible gas to said chamber substantially constant, means for producing combustion of said combustible gas with said oxygen whereby a temperature is produced in said chamber which changes in accordance with changes in the density of the oxygen in said desired region, control means responsive to said temperature changes, and actuating means controlled by said temperature responsive control means for operating said oxygen supplying means to supply oxygen to said desired region in substantially inverse proportion to the density of the oxygen in said region.

6. In combination, an oxygen tank containing oxygen under pressure, means for supplying said oxygen to a desired region, a combustion chamber, means for passing some of the oxygen from said region to said combustion chamber, means for supplying a combustible gas or vapor to said combustion chamber, means for maintaining the supply of said combustible gas or vapor substantially constant, means in said chamber whereby in the presence thereof said combustible gas or vapor is ignited and combustion thereof with said oxygen is produced, said combustion being greater or less when the density of the oxygen from the desired region is greater or less, thereby producing a temperature in said combustion chamber which varies with changes in the density of the oxygen, a resistance element located in said combustion chamber and adapted to have its resistance changed in accordance with the changes in temperature in said combustion chamber, a Wheatstone bridge circuit including said resistance element in one arm of the bridge whereby said bridge circuit becomes unbalanced upon a change in temperature in said combustion chamber due to a change in the density of the oxygen, control means responsive to an unbalance of the bridge circuit, actuating means control ;d by said control means for operating said oxygen supplying means whereby oxygen is supplied to the desired region in accordance with the changes in the density of the oxygen in said region, and means simultaneously operable by said actuating means for balancing the bridge circuit whereby said control means and actuating means are rendered ineffective.

7. Apparatus for maintaining a normal respiratory condition in a desired region, comprising means controlling the supply of a respiratory medium to said region, means for analyzing the medium in said region to determine whether the amount of oxygen per unit volume of respiratory medium in said region has changed from that at a normal respiratory condition and means responsive to said changes for controlling said first means.

8. Apparatus for regulating the respiratory medium in a desired region, comprising means for extracting from said region a sample of the respiratory medium therein, means responsive to the changes in the amount of oxygen per unit volume contained in said sample and means operable by said change-responsive means for supplying oxygen to said region in substantially inverse proportion to the amount of oxygen per unit volume contained in the sample.

9. Apparatus for regulating the respiratory medium in a desired region, to maintain normal breathing conditions comprising control means responsive to changes in the density of a gas in said medium, means for supplying said gas to said region, actuating means controlled by said control means for operating said gas supplying means whereby gas is supplied to said desired region, in accordance with the changes in the density of said gas and means operated by said actuating means simultaneously with said gas supplying means, for causing said control means to render said actuating means ineffective.

10. Apparatus for automatically supplying the necessary amount of oxygen required for breathing purposes on an aircraft, comprising a tank containing oxygen under pressure, means for supplying said oxygen to the air being breathed, and means responsive to changes in the amount of oxygen per unit volume of the air being breathed for controlling the oxygen supplying means in accordance with said changes.

VICTOR E. CARBONARA.